May 8, 1934.   F. M. PENNING   1,958,066
COMBINED LAMP AND PHOTOTUBE
Original Filed Sept. 4, 1928
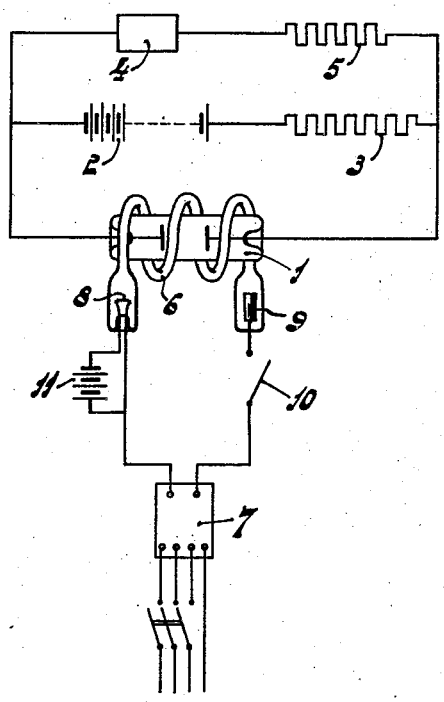
Inventor
Frans M. Penning Patented May 8, 1934

1,958,066

UNITED STATES PATENT OFFICE 1,958,066

COMBINED LAMP AND PHOTOTUBE

Frans Michel Penning, Eindhoven, Netherlands, assignor, by mesne assignments, to General Electric Company, a corporation of New York Application September 4, 1928, Serial No. 303,946. Renewed September 13, 1933. In the Netherlands March 29, 1928

2 Claims. (Cl. 250—27.5)

This invention relates to an improved process of influencing an electric current by means of radiation.

Devices for converting optical phenomena into electric phenomena are frequently used in the art. As such devices, we may mention, for example, selenium and other photoelectric cells. They are of great importance in connection with the manufacture of so-called "speaking films", for the transmission of images by telegraphic or radiotelegraphic agency etc. A prime condition of such devices is generally that the conversion of light variations into electric phenomena should be effected with a minimum of inertia.

In the process according to the invention the current or the voltage in an electric circuit is influenced by means of radiation in that this radiation strikes an electric discharge tube included in the said circuit. This discharge tube contains a supply of gas or vapour (main gas) the atoms of which can be in metastable conditions. This gas or vapour has added to it a small supply of some other gas the atoms of which can be ionized by metastable atoms of the main gas.

The discharge tube may, for example, be filled with neon which has added to it a small supply, say 0.001%, of argon.

The process according to the invention permits of obtaining particularly good results if the radiation is effected by light of such a wave length that it can be absorbed by the gas atoms in a metastable state.

Thus, for example, if the tube possesses the gaseous filling mentioned here by way of example, neon light can be used with advantage for the radiation.

The influence of the light rays on the electric circuit in the process according to the invention is related with the metastable conditions of the main gas used in the discharge tube. The discharge is partially established in that atoms which are in a metastable state ionize atoms of the gas present as the admixture. Now, if atoms of the main gas which are in a metastable state are struck by light of a given wave length they are transferred from this state in more or less great numbers into a non-metastable state of higher energy. In this state the life of these atoms is so short that the probability of a collision with an atom of the admixture is extremely small. Consequently the ionization in the tube decreases at once and correspondingly the discharge current. In the same manner it is comprehensible that as a result of radiation the discharge voltage of a discharge tube possessing the above mentioned gas mixture is increased. As the extent to which the current is decreased or the discharge voltage respectively is increased depends on the nature of the light variations, the current or the voltage variations respectively afford a means to registrate the said light variations or to reproduce them elsewhere. Hereinafter a process according to the invention will be more fully explained, but only by way of example, reference being had to the accompanying drawing.

In the said drawing 1 designates an electric discharge tube which is filled with a main gas, for example neon, under a pressure of some centimeters of mercury and additional argon. A very low percentage, say 0.001%, of this second gas can suffice. Gases other than those mentioned may be used provided the main gas has the characteristic that its atoms can be in a metastable state and in this state can ionize atoms of the admixture, for example in that the excitation potential of such a metastable state is higher than the ionization potential of the admixture. A sufficiently high voltage is supplied between the electrodes of the tube 1 via a resistance 3 by means of a battery 2 or some suitable source of current. Under the influence of this voltage atoms of the main gas are transferred into a metastable state, said atoms ionizing in that state atoms of the admixture. Thus a feeble discharge current of some micro-amperes passes through the tube. The potential difference which then prevails between the electrodes is measured or registered by means of some sensitive instrument, for example an electrostatic voltmeter 4 which is connected, if necessary in series with a resistance 5, between the electrodes of the tube. A helically wound neon light tube 6 surrounds the discharge tube 1. This luminous tube is supplied, for example from a rectifier 7 and comprises an incandescent cathode 8 and a cold anode 9. Now, if the switch 10 is closed a current passes through the tube 6 and the latter begins to give off light which affects the discharge in the tube 1. Indeed, in this tube a number of atoms of the main gas which are in a metastable state, are transferred by reason of the radiation by the light of the tube 6 into a non-metastable state of higher energy, in which they remain for such a short time that there is but very little probability of collisions with an atom of the admixture. Thus the ionization decreases and correspondingly the discharge current in tube 1, which is incidental to an increase of the voltage between the electrodes of this tube. If on the contrary the switch 10 is opened, the current in the tube 1 increases and the voltage between the electrodes falls. Under certain circumstances a potential variation of some 50 volts may be observed as a result of the radiation.

The greatest effect is observed if in the light radiated by the tube 6 that part of the wave-length spectrum is greatly represented that can be absorbed by a metastable state. For this reason neon light can be used with advantage if the discharge tube 1 contains neon as the main gas.

It is obvious that only the value and not the direction of the current in the luminous tube 6 influences the action of the tube 1 so that the process also affords a means of making intensity variations of an alternating current in the circuit in which the light emitting tube 6 is inserted manfest by variations of the direct current in the circuit in which the light receiving tube 1 is included. For this purpose the tube 6 which in this case may possess, if desired, two filament electrodes, may be supplied by means of an alternating current on which the variations to be observed are superimposed.

What I claim is:

1. A light sensitive unit comprising an envelope housing spaced electrodes, and a gas comprising neon to which has been added .001% of argon, and a helically wound light radiator surrounding said envelope and comprising a tube having spaced electrodes, one of which is of the double terminal incandescible type, and having neon filling said tube, whereby said tube may emit radiations of wave length which can be absorbed by the gas atoms in a metastable state in said envelope to decrease ionization in said envelope.

2. A light sensitive unit comprising an envelope housing spaced electrodes, and a gas comprising neon to which has been added .001% of argon, and a light radiator surrounding said envelope and comprising a tube having spaced electrodes, one of which is of the thermionic type and having neon filling said tube, whereby said tube may emit radiations of wave length which can be absorbed by the gas atoms in a metastable state in said envelope to decrease ionization in said envelope.

FRANS MICHEL PENNING.